United States Patent
Rawashdeh et al.

(10) Patent No.: US 10,300,894 B2
(45) Date of Patent: May 28, 2019

(54) AUTO-BRAKING SYSTEM FOR VEHICLE AND METHOD FOR AUTO-BRAKING VEHICLE

(71) Applicants: DENSO International America, Inc., Southfield, MI (US); DENSO CORPORATION, Kariya, Aichi-pref. (JP)

(72) Inventors: Zaydoun Rawashdeh, Farmington, MI (US); Rajesh Malhan, Troy, MI (US); Trong Duy Nguyen, Novi, MI (US); Anoop Pottammal, Canton, MI (US)

(73) Assignees: DENSO International America, Inc., Southfield, MI (US); DENSO CORPORATION, Kariya-city ( * ) Notice: Subject to any disclaimer, the term of this patent is extended or adjusted under 35 U.S.C. 154(b) by 106 days.

(21) Appl. No.: 15/456,880

(22) Filed: Mar. 13, 2017

(65) Prior Publication Data
US 2018/0257615 A1    Sep. 13, 2018

(51) Int. Cl.
*B60T 7/12* (2006.01)
*B60T 8/172* (2006.01)
(Continued)

(52) U.S. Cl.
CPC .................. *B60T 7/12* (2013.01); *B60T 7/18* (2013.01); *B60T 7/22* (2013.01); *B60T 8/172* (2013.01); *G06K 9/00825* (2013.01); *G06K 9/4652* (2013.01); *G06K 9/6215* (2013.01); *B60T 2201/022* (2013.01); *B60T 2201/03* (2013.01); *B60T 2210/36* (2013.01)

(58) Field of Classification Search
CPC ..... B60T 7/12; B60T 7/22; B60T 7/18; B60T 8/172; B60T 2201/022; B60T 2201/03; B60T 2210/36; G06K 9/6215; G06K 9/4652; G06K 9/00825
See application file for complete search history.

(56) References Cited

U.S. PATENT DOCUMENTS

| | | | |
|---|---|---|---|
| 9,824,587 B2 * | 11/2017 | Chundrlik, Jr. | ......... B60T 8/171 |
| 2015/0046038 A1 * | 2/2015 | Kawamata | ............ B60W 30/09 701/41 |
| 2015/0124096 A1 * | 5/2015 | Koravadi | ........... G06K 9/00825 348/148 |

FOREIGN PATENT DOCUMENTS

| | | |
|---|---|---|
| JP | H06-12592 A | 1/1994 |
| JP | 2007-034693 A | 2/2007 |

* cited by examiner

*Primary Examiner* — Nadeem Odeh
*Assistant Examiner* — Michael V Kerrigan

(57) ABSTRACT

The present disclosure provides an auto-braking system which includes a braking device, a receiver, and a controller. The controller includes a determining portion, a verifying portion and an executing portion. The determining portion determines whether a vehicle will violate a red signal of the traffic light based on the traffic light state information. The verifying portion verifies the traffic light state information is valid by comparing the traffic light state information with the image of the traffic light captured by the sensor. The executing portion executes a first braking control to slow the vehicle at a first deceleration rate when the determining portion determines that the vehicle will violate a red signal. The executing portion executes a second braking control to slow the vehicle at a second deceleration rate to stop at a specified position when the verifying portion verifies that the traffic light state information is valid.

16 Claims, 6 Drawing Sheets

(51) Int. Cl.
*G06K 9/00* (2006.01)
*B60T 7/18* (2006.01)
*B60T 7/22* (2006.01)
*G06K 9/46* (2006.01)
*G06K 9/62* (2006.01)

AUTO-BRAKING SYSTEM FOR VEHICLE AND METHOD FOR AUTO-BRAKING VEHICLE

TECHNICAL FIELD

The present disclosure relates to an auto-braking system for a vehicle and a method for auto-braking a vehicle.

BACKGROUND

One of the emerging technologies that has the potential of preventing crashes or reducing the impact speed of the crash is the Auto Emergency Brake. This added feature analyzes forward collisions; warns the driver in critical situations; and applies brakes independently if the driver did not respond on time. Auto emergency brake systems are capable of intervening and bring the brake capacity to 100% even if the driver has reacted but his reaction is not enough.

The use of auto emergency brake systems has reduced the accidents risks significantly. Typically, conventional systems rely mainly on cameras for object detection. Such systems automatically cause the vehicle to slow when the camera detects a red signal of a traffic light, for example. However, even if the camera detects the red signal, the vehicle cannot stop safely before the traffic light in some scenarios. One of the scenarios may easily occur when vehicles approach the traffic light at higher speed.

In view of the above, it is an objective to provide an auto-braking system and a method for auto-braking a vehicle that safely and surely stops the vehicle before a traffic light.

SUMMARY

This section provides a general summary of the disclosure, and is not a comprehensive disclosure of its full scope or all of its features.

In a first aspect of the present disclosure, an auto-braking system for a vehicle includes a braking device, a receiver, and a controller. The braking device slows the vehicle. The receiver receives messages each containing traffic light state information from a traffic light ahead of the vehicle over Vehicle-to-Infrastructure communication. The sensor optically captures an image of the traffic light. The controller controls operation of the braking device. The controller includes a determining portion, a verifying portion, and an executing portion. The determining portion determines whether the vehicle will violate a red signal of the traffic light, if the vehicle continues to travel under current traveling conditions, based on the traffic light state information. The verifying portion verifies the traffic light state information is valid by comparing the traffic light state information with the image of the traffic light captured by the sensor. The executing portion executes (i) a first braking control to slow the vehicle at a first deceleration rate by controlling the braking device when the determining portion determines that the vehicle will violate a red signal and (ii) a second braking control to slow the vehicle at a second deceleration rate to stop at a specified position by controlling the braking device when the verifying portion verifies that the traffic light state information is valid.

In a second aspect of the present disclosure, an auto-braking controller for a vehicle includes a determining portion, a verifying portion, and an executing portion. The determining portion determines the vehicle will violate a red signal of a traffic light ahead of the vehicle, if the vehicle continues to travel under current traveling conditions, based on traffic light state information contained in each of messages received from the traffic light over Vehicle-to-Infrastructure communication. The verifying portion verifies the traffic light state information is valid by comparing the traffic light state information with an image of the traffic light optically captured by a sensor. The executing portion executes (i) a first braking control to slow the vehicle at a first deceleration rate by controlling a braking device when the determining portion determines that the vehicle will violate a red signal and (ii) a second braking control to slow the vehicle at a second deceleration rate to stop at a specified position by controlling the braking device when the verifying portion verifies that the traffic light state information is valid.

In a third aspect of the present disclosure, a method for auto-braking a vehicle includes (i) receiving, with a receiver, messages each containing traffic light state information from a traffic light ahead of the vehicle over Vehicle-to-Infrastructure communication, (ii) determining, with a determining portion, whether the vehicle will violate a red signal of the traffic light, if the vehicle continues to travel under current traveling conditions, based on the traffic light state information, (iii) executing, with an executing portion, a first braking control to slow the vehicle at a first deceleration rate by controlling a braking device when the determining portion determines that the vehicle will violate a red signal, (iv) verifying, with a verifying portion, the traffic light state information is valid by comparing the traffic light state information with the image of the traffic light captured by the sensor, and (v) executing, with the executing portion, a second braking control to slow the vehicle at a second deceleration rate to stop at a specified position by controlling the braking device when the verifying portion verifies that the traffic light state information is valid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. In the drawings.

DETAILED DESCRIPTION

In the following embodiment, an auto-braking system for a vehicle and a method for auto-braking the vehicle will be described with reference to drawings.

Figure 1:
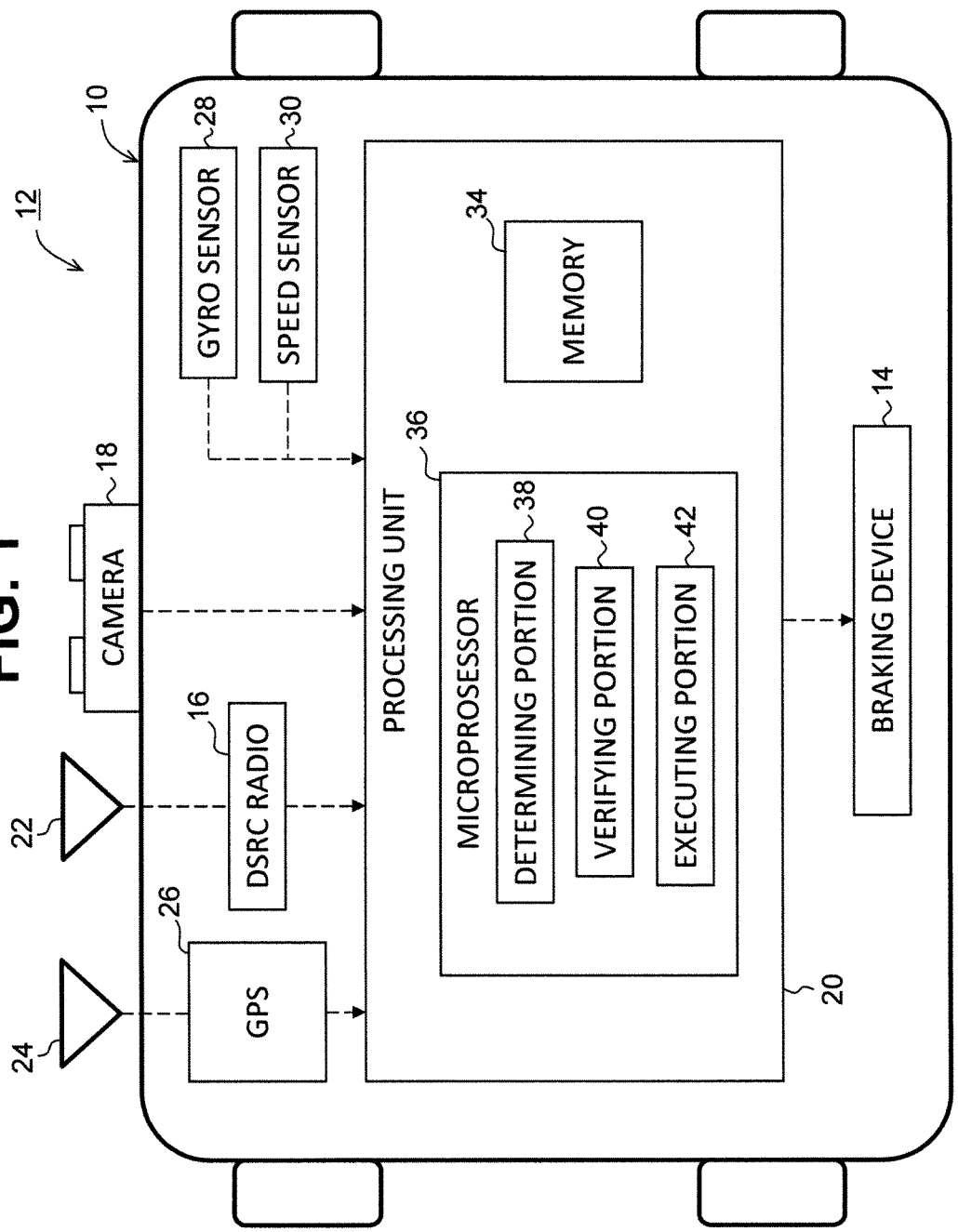
FIG. 1 is a block diagram of an auto-braking system according to an embodiment.

FIG. 1 shows a block diagram of an auto-braking system 10 according to the present embodiment which is mounted to a vehicle 12. The auto-braking system 10 generally includes a braking device 14, a dedicated short range communications (DSRC) radio (a receiver) 16, a camera 18, and a processing unit (a controller, an auto-braking controller) 20. The auto-braking system 10 also includes a DSRC antenna 22, a GPS antenna 24, a global positioning system (GPS) 26, a gyro sensor 28, and a speed sensor 30.

The braking device 14 is mounted to the vehicle 12 and can be any type of braking systems such as a disc braking system or a drum braking system. The braking device 14 is normally operated by a driver of the vehicle 12. The braking device 14 is electrically connected to the processing unit 20 so that the braking device 14 can be also operated by the processing unit 20 in a situation where auto-braking is required. For example, the auto-braking may be required when a driver of the vehicle 12 does not start operating the braking device 14 even if the vehicle 12 approaches a traffic signal with a red signal.

The DSRC antenna 22 is mounted on, for example, a windshield or roof of the vehicle 12. The DSRC radio 16 is also mounted to the vehicle 12 and is electrically connected to the DSRC antenna 22. The DSRC radio 16 is configured to transmit/receive, through the DSRC antenna 22, messages to/from surrounding remote vehicles and infrastructures (Road Side Units (RSU)) such as traffic lights 32. More specifically, the DSRC radio 16 transmits/receives successively basic safety messages (BSMs) to/from remote surrounding vehicles equipped with similar DSRC systems over V2V (Vehicle-to-Vehicle) communication. Furthermore, the DSRC radio 16 successively transmits/receives messages to/from infrastructures such as traffic lights 32 over Vehicle-to-Infrastructure communication. In the present embodiment, the Vehicle-to-Infrastructure communication includes V2I communication through which the vehicle 12 sends messages to infrastructures and I2V communication through which infrastructures send messages to the vehicle 12. In this embodiment, traffic lights 32 send the vehicle 12 Signal Phase and Timing (SPaT) messages and Map data (MAP) messages (hereinafter, collectively referred to as "SPaT/MAP messages") every 1000 ms, for example. The SPaT/MAP messages contain traffic light state information of traffic lights 32 from which the SPaT/MAP messages are transmitted.

The traffic light state information includes, for example, the current status of the traffic light 32 (i.e., red, yellow, or green), a signal change timing at which the next signal change will occur (i.e., green to yellow, yellow to red, red to green), and positional information (a geometrical location) of the traffic light 32. More specifically, the SPaT messages contain the current status of the traffic light 32 and the signal change timing. The MAP messages contain the positional information of the traffic light 32. The DSRC radio 16 is configured to receive the SPaT/MAP messages at most about 1000 m away from a traffic light 32, for example. Therefore, the DSRC radio 16 would successively receive the SPaT/MAP messages from a traffic light 32 ahead of the vehicle 12 when the vehicle 12 reaches a range 1000 m away from the traffic light 32 (i.e., the maximum communication range is 1000 m).

The camera 18 is an on-board camera such as a Flea3® camera. The camera 18 is mounted on the windshield of the vehicle 12 to optically capture an image of a scene ahead of the vehicle 12. For example, the camera 18 has a frame rate of 15 FPS. The maximum recognition range of the camera 18, at which the camera 18 is able to recognize the traffic light color, relies on characters of the camera 18 or environmental conditions such as a raining condition or a foggy condition. The camera 18 preferably has the maximum recognition range of at least 20 m. In this embodiment, the maximum recognition range of the camera 18 is about 27 m (see FIGS. 2 and 3). The camera 18 is connected to the processing unit 20 through an Ethernet network and images captured by the camera 18 are transmitted to the processing unit 20.

The GPS antenna 24 is mounted on, for example, the windshield or roof of the vehicle 12. The GPS 26 is connected to the GPS antenna 24 to receive positional information (a current position) of the vehicle 12 from a GPS satellite (not shown). More specifically, the current position includes a latitude and a longitude of the vehicle 12. The GPS 26 is connected to the processing unit 20 through the Ethernet network and transmits the current position to the processing unit 20.

As shown in FIG. 1, the speed sensor 30 and the gyro sensor 28 are connected to the processing unit 20 through a Controller Area Network (CAN). The speed sensor 30 is configured to detect a vehicle speed of the vehicle 12. The speed sensor 30 transmits the vehicle speed to the processing unit 20. The gyro sensor 28 is configured to detect heading of the vehicle 12. The gyro sensor 28 transmits the heading of the vehicle 12 to the processing unit 20.

In the present embodiment, the processing unit 20 may be formed of a memory 34 and a microprocessor 36. Although the processing unit 20 is described and depicted as one component in this embodiment and drawings, the processing unit 20 is merely represented as a block of main functions of the auto-braking system 10, and actual processors performing these functions may be separately disposed in the system 10. For example, an actual processor for processing the SPaT/MAP messages may be included in a DSRC system mounted on the vehicle. Similarly, an actual processor for processing image data may be included in the camera 18.

The memory 34 may include a random access memory (RAM) and read-only memory (ROM) and store programs. The programs in the memory 34 may be computer-readable, computer-executable software code containing instructions that are executed by the microprocessor 36. That is, the microprocessor 36 carries out functions by performing programs stored in the memory 34. The memory 34 also temporarily stores the SPaT/MAP messages received by the DSRC radio 16 from traffic lights 32.

The processing unit 20 is configured to control the braking device 14 by carrying out functions of the microprocessor 36 when an emergency situation occurs. Specifically, the processing unit 20 performs a Comfortable Emergency Brake (CEB) under such an emergency situation to slow and stop the vehicle 12 in a safe, comfortable manner without violating a red signal of a traffic light 32. In this embodiment, the processing unit 20 performs the CEB in two phases, an "Automated Comfortable Brake (ACB)" and a "full stop Automated Emergency Brake (AEB)", as will be described below in detail.

To execute the CEB, the microprocessor 36 in the present embodiment includes a determining portion 38, a verifying portion 40, and an executing portion 42, as shown in FIG. 1.

The determining portion 38 is configured to determine, based on the traffic light state information, whether the vehicle 12 will violate a red signal of a traffic light 32 if the vehicle 12 continues to travel under current travelling conditions (i.e., a current speed, current heading).

Figure 2:
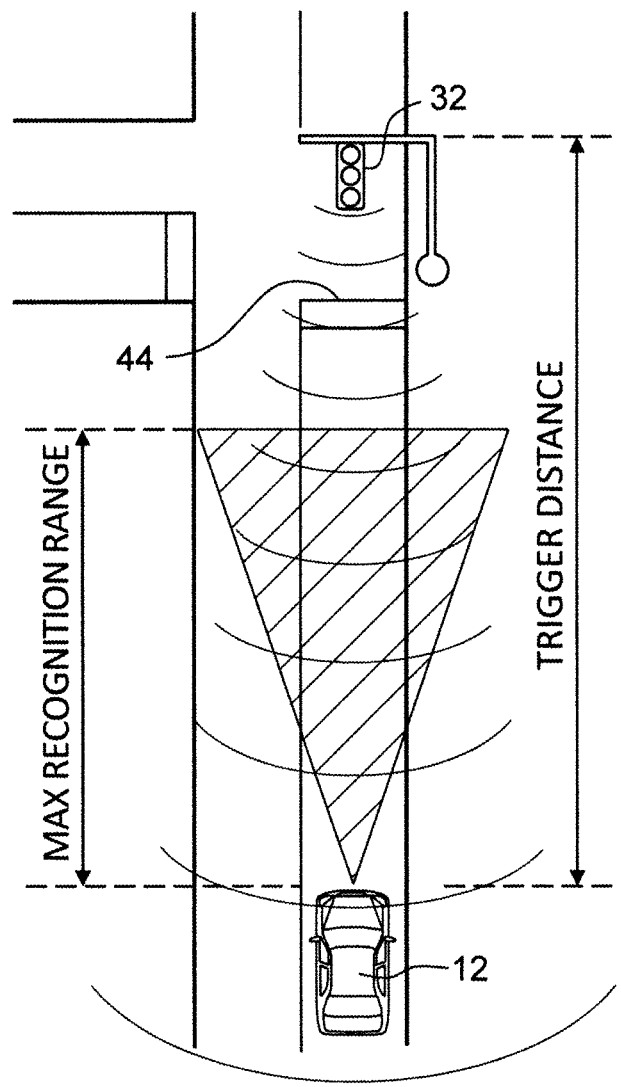
FIG. 2 is a diagram schematically illustrating a situation where a vehicle reaches a position a trigger distance away from a traffic light.

The determining portion 38 executes traffic light localization first based on the positional information contained in the MAP messages. The traffic light localization is performed to determine whether the traffic light 32, from which the SPaT/MAP messages are transmitted, is located in the lane where the vehicle 12 is travelling. The determining portion 38 performs the traffic light localization when the vehicle 12 reaches a position a specified distance (e.g., 100 m) away from the traffic light 32. The specified distance is set to be less than the maximum communication range (i.e., 1000 m) but greater than the maximum recognition range, as shown in FIG. 2. Hereinafter, the specified distance is referred to as a "trigger distance".

Figure 3:
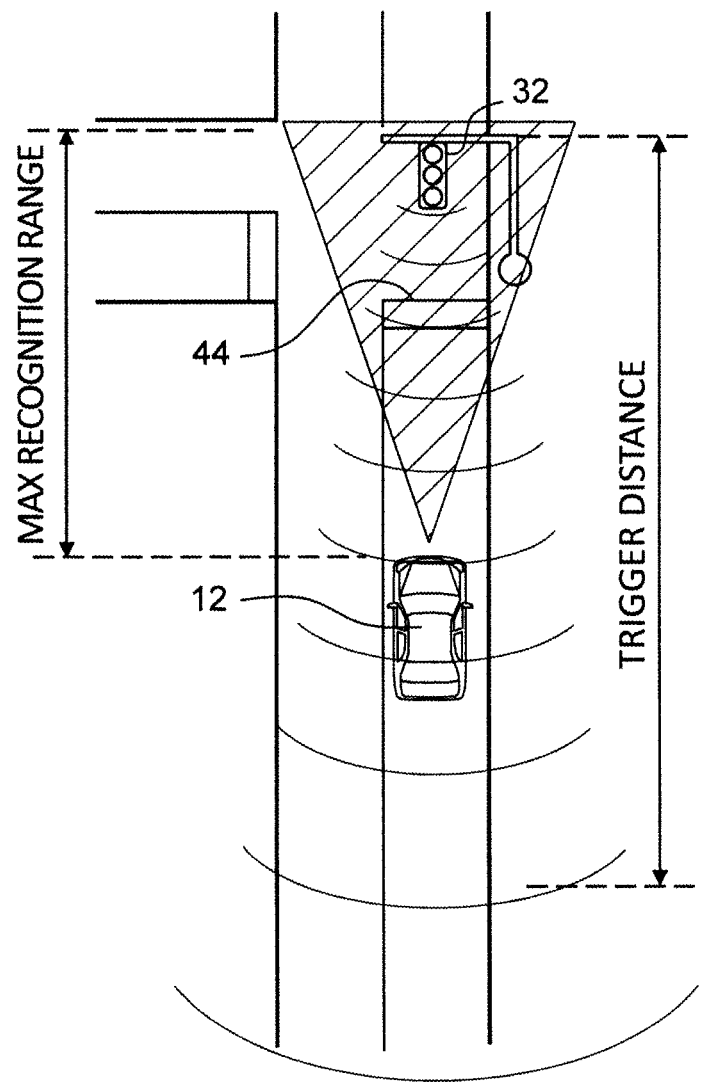
FIG. 3 is a diagram schematically illustrating a situation where the traffic light is within a maximum recognition range of a camera.

The determining portion 38 performs the traffic light localization by comparing the positional information of the traffic light 32 contained in the MAP messages with the current position of the vehicle 12 received by the GPS 26 and the heading obtained by the gyro sensor 28. If the traffic light 32 is located in the same lane as the vehicle 12, the determining portion 38 next determines whether the vehicle 12 will violate a red signal of the traffic light 32 under the current travelling conditions. More specifically, the determining portion 38 calculates the distance to a stop position (a specified position) 44 at which the vehicle 12 needs to stop. The stop position 44 can be any position before the traffic light 32. For example, the stop position 44 may be a stop line in an intersection where the traffic light 32 is located as shown in FIGS. 2 and 3. Alternatively, the stop position 44 may be determined based on traffic conditions such as other surrounding vehicles ahead of the vehicle 12. In this embodiment, the specified position is defined as a stop line of an intersection where a traffic light 32 is located.

After calculating the distance to the traffic light 32, the determining portion 38 next estimates an arrival time when the vehicle 12 reaches the stop position 44 if the vehicle 12 continues to travel at the current speed. Then, the determining portion 38 determines whether the vehicle 12 will violate a red light of the traffic light 32 based on the arrival time, a current status of the traffic light 32, and a signal change timing contained in the SPaT message currently received by the DSRC radio 16. Once the determining portion 38 determines that the vehicle 12 will violate a red signal of the traffic light 32, the ACB (a first braking control) is executed by the executing portion 42.

The executing portion 42 is configured to execute the ACB and/or the AEB by controlling the braking device 14. During the ACB, the executing portion 42 is configured to control the braking device 14 to slow the vehicle 12 at a comfortable deceleration rate (a first deceleration rate) $a_{acb}$. In the present embodiment, the comfortable deceleration rate $a_{acb}$, which has a negative value, is calculated depending on current traveling conditions, environmental conditions surrounding the vehicle 12, or the like. Further, the comfortable deceleration rate $a_{acb}$ is calculated such that the vehicle 12 would stop at the stop position 44 or would reach the stop position 44 at a traveling speed less than the current speed. Alternatively, the comfortable deceleration rate $a_{acb}$ may be set to have a predetermined value.

The verifying portion 40 is configured to execute a verifying process during the ACB. The verifying process is a process to validate the content of the SPaT/MAP messages before executing the AEB (a second braking control). In other words, the verifying process is performed to decide whether the AEB should be actually executed based on the SPaT/MAP messages received.

The verifying process is executed when the camera 18 starts capturing (recognizing) the traffic signal in the ACB (see FIG. 3). In other words, the verifying process starts when the vehicle 12 reaches the traffic light 32 so that the traffic light 32 is within the maximum recognition range (within in a detection field of view) of the camera 18 (i.e., about 27 m). During the verifying process, the verifying portion 40 compares the current status of the traffic light 32 captured by the camera 18 with the traffic light state information in the SPaT message which was most recently received by the DSRC radio 16.

Figure 4:
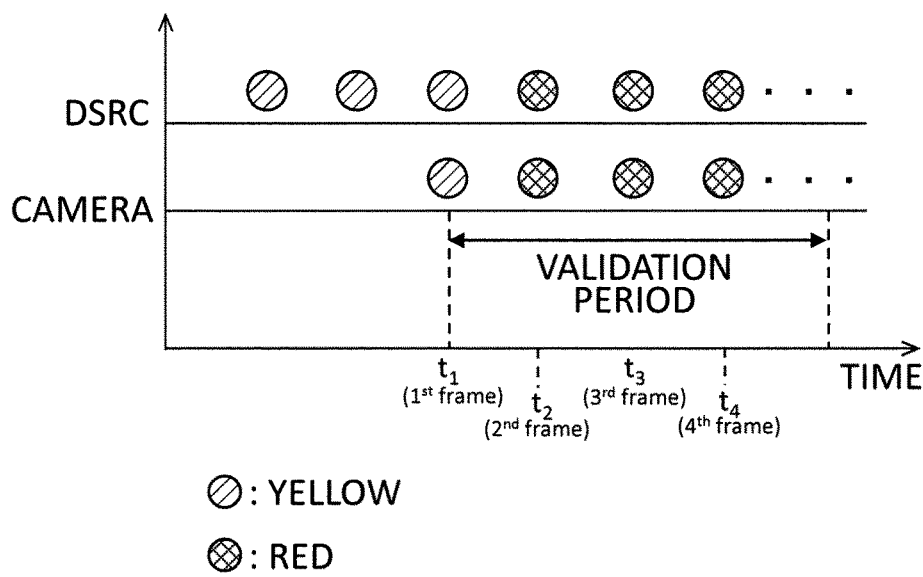
FIG. 4 is a diagram showing a matching process between contents of Signal Phase and Timing message and an image of the traffic light detected by the camera.

FIG. 4 is an illustrative example showing how the verifying process is performed. As shown in FIG. 4, the traffic light state information is received early via SPaT messages since the maximum transmission range of the SPaT messages is greater than the maximum recognition range of the camera 18 (see FIG. 2). Once the traffic light 32 is within the maximum recognition range (the detection field of view) of the camera 18 as shown in FIG. 3, the current status is obtained from the image captured by the camera 18.

The verifying portion 40 performs "confidence level test" after obtaining the current status of the traffic light 32 by the camera 18. This confidence level test is performed to verify the accuracy of the current status (i.e., green, yellow or red) of the traffic light 32 for each frame obtained from the image data. More specifically, the verifying portion 40 detects the color of the traffic light 32 from the captured image through color image processing. The color of the traffic light 32 is recognized for each frame of the captured image. Then, the verifying portion 40 confirms whether the confidence level of the color obtained the color image processing is equal to or greater than a specified value. If the confidence level for each frame is equal to or greater than the specified value, then the verifying portion 40 proceeds to matching process. In other words, the verifying portion 40 performs the matching process only when the current status of the traffic light 32 is obtained through the image data with high accuracy. In this embodiment, the specified value is set to 90%, and therefore the verifying portion 40 requires 90% or more of the confidence level to pass the confidence level test.

During matching process, the verifying portion 40 compares the color of the traffic light 32 obtained from the SPaT message, which was most recently received by the DSRC radio 16, with the color of the traffic light 32 obtained from the image for a validation period. This validation period can vary depending on the number of frames/sec the verifying portion 40 can process, on the number of frames required for validation, on the vehicle speed, or the like. In this embodiment, the validation period is set to be 500 ms, for example.

For example, FIG. 4 shows the camera 18 captures the image of the traffic light 32 on frames ($1^{st}$ to $N^{th}$ frames) at timings $t_1, t_2, t_3, t_4 \ldots t_N$. At the timing $t_1$, the camera 18 detects the color (yellow) of the traffic light 32 from the $1^{st}$ frame. The verifying portion 40 also recognizes the color of yellow at the timing $t_1$ based on the traffic light state information contained in the SPaT message. Therefore, the verifying portion 40 determines that the color obtained from the SPaT message matches with the color of the $1^{st}$ frame. At the timing $t_2$, the camera 18 detects the color (red) of the traffic light 32 from the $2^{nd}$ frame. The verifying portion 40 also recognizes that the color of the traffic light 32 at the timing $t_2$ is red based on the traffic light state information. Therefore, the color obtained from the SPaT message matches with the color in the $2^{nd}$ frame. In this way, the verifying portion 40 performs the matching process by comparing the color obtained from the SPaT message with the color obtained from the captured image for each frame during the validation period.

If n consecutive frames over the validation period matches with the SPaT message, the verifying portion 40 verifies that the content in the SPaT/MAP message (i.e., the traffic light 32 status information) is valid.

When the verifying portion 40 verifies that the content in the SPaT message is valid, the executing portion 42 executes the AEB by controlling the braking device 14 to stop the vehicle 12. In the AEB, the braking device 14 is controlled to slow the vehicle 12 at a full stop deceleration rate (a second deceleration rate) $a_{aeb}$. The full stop deceleration rate $a_{aeb}$ has a negative value and is calculated such that the vehicle 12 can stop at the stop position 44 safely.

Figure 5:
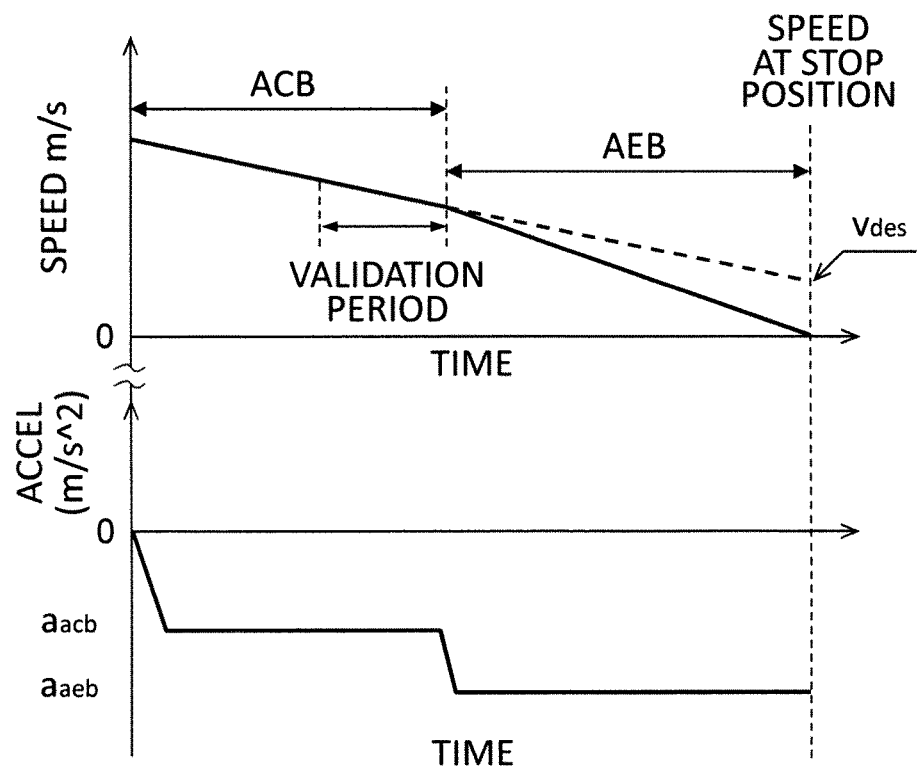
FIG. 5 is a graph showing a vehicle speed, a comfortable deceleration rate and a full stop deceleration rate during Automatic Comfortable Brake and Automatic Emergency Brake.

In this embodiment, the full stop deceleration rate $a_{aeb}$ is calculated so that the absolute value of the full stop deceleration rate $a_{aeb}$ is greater than that of the comfortable deceleration rate $a_{acb}$. In other words, the full stop deceleration rate $a_{aeb}$ is less than the comfortable deceleration rate $a_{acb}$, as shown in the lower graph of FIG. 5.

Figure 6:
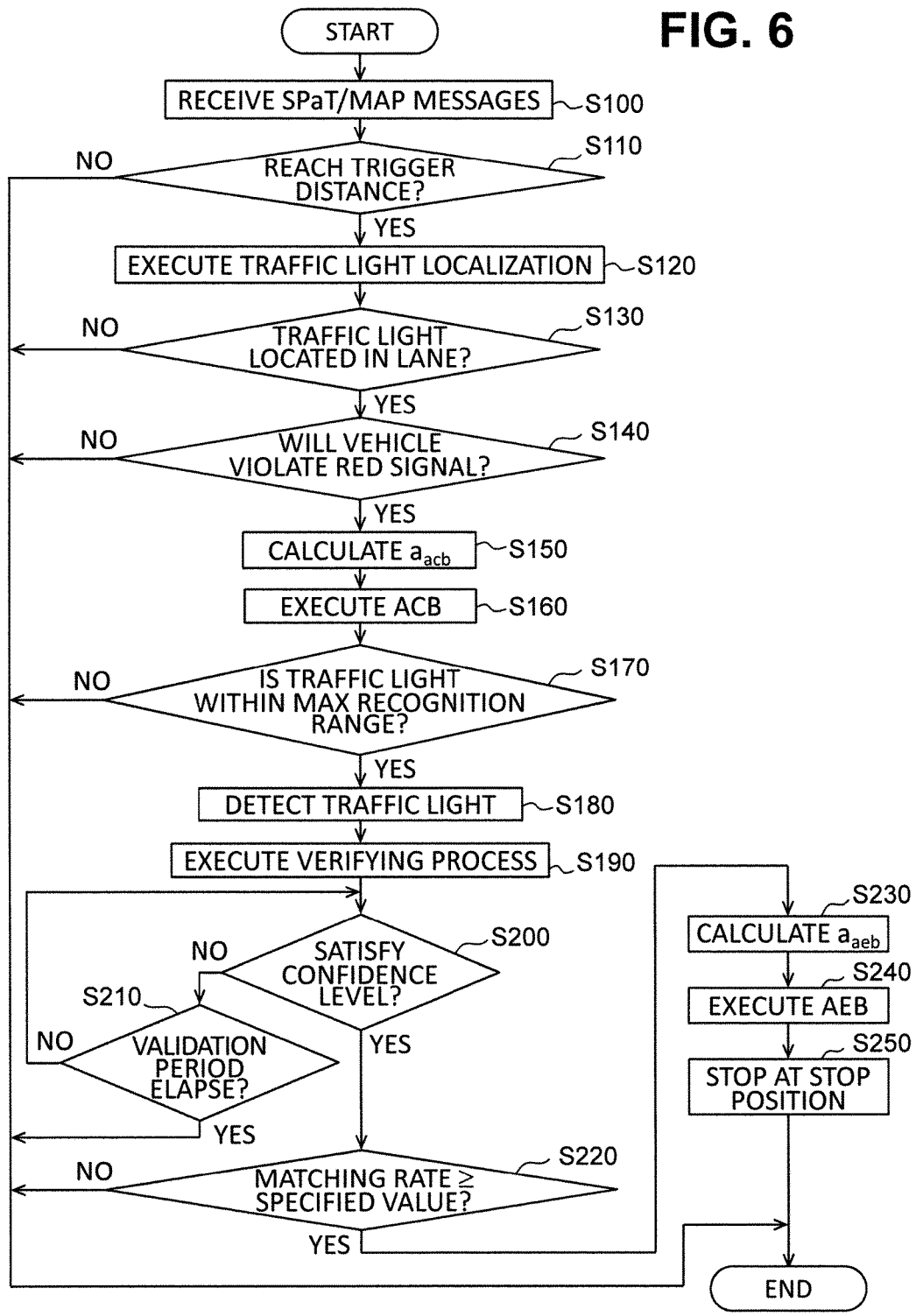
FIG. 6 is a flowchart of an entire process executed by the auto-braking system.

Next, operation of the auto-braking system 10 according to the present embodiment will be described below with reference to FIG. 6. The auto-braking system 10 (the processing unit 20) repeatedly performs the operation shown in the flowchart of FIG. 6 during traveling of the vehicle 12. In this example, it is assumed that the vehicle 12 is traveling along a lane of a road toward an intersection (T-junction) where a traffic light 32 is installed (see FIG. 2).

When the vehicle 12 reaches the maximum communication range of the traffic light 32 (i.e., about 1000 m away from the traffic light 32), the DSRC radio 16 starts receiving SPaT/MAP messages from the traffic light 32 at Step 100. The vehicle 12 further approaches the traffic signal, and when the vehicle 12 reaches the trigger distance (i.e., about 100 m away from the traffic signal) at Step 110 (YES), the determining portion 38 executes the traffic light localization at Step 120. In the traffic light localization, the determining portion 38 determines whether the traffic light 32, from which the auto-braking system 10 receives the SPaT/MAP messages, is located in the lane where the vehicle 12 is travelling at Step 130. If the traffic light 32 is located in the lane (Step 130: YES), the process proceeds to Step 140. On the other hand, if Step 130 is negative (NO), the process terminates.

Figure 7:
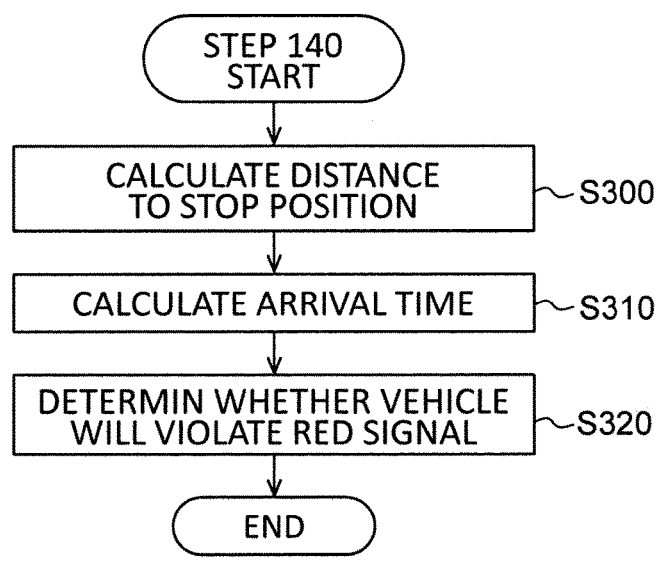
FIG. 7 is a flowchart of a detail process of Step 140 in FIG. 6.

At Step 140, the determining portion 38 determines whether the vehicle 12 will violate a red signal of the traffic light 32 if the vehicle 12 continues to travel under the current travelling conditions. The process at Step 140 is described in detail with reference to FIG. 7. The determining portion 38 calculates a distance to the stop position 44 (the stop line of the intersection) from the current position of the vehicle 12 at Step 300. Then, the determining portion 38 calculates, at Step 310, the arrival time, at which the vehicle 12 will arrive the stop position 44, based on the distance obtained at Step 300 and the current speed obtained by the speed sensor 30. At Step 320, the determining portion 38 determines whether the vehicle 12 will violate a red signal of the traffic light 32 based on the arrival time, the current status of the traffic light 32, and the signal change timing contained in the SPaT message.

Referring back to FIG. 6, if the determining portion 38 determines that the vehicle 12 will not violate a red signal of the traffic light 32 (Step 140: NO), the process terminates. Conversely, if the determining portion 38 determines that the vehicle 12 will violate a red signal (Step 140: YES), the executing portion 42 executes the ACB. At Step 150, the executing portion 42 calculates first the comfortable deceleration rate $a_{acb}$. Then, at Step 160, the executing portion 42 controls the braking device 14 to slow the vehicle 12 at the comfortable deceleration rate $a_{acb}$.

When the vehicle 12 further travels and the traffic light 32 is within the maximum recognition range of the camera 18 (i.e., about 27 m away from the traffic light 32) (Step 170: YES), the camera 18 detects the traffic light 32 at Step 180. Then, the verifying portion 40 executes the verifying process for the validation period at Step 190. In the verifying process, the verifying portion 40 obtains the color of the traffic light 32 for each frame from the image data captured by the camera 18. Then, the verifying portion 40 executes the confidence level test at Step 200. If the confidence level for each frame is equal to or greater than 90% (Step S200: YES), the verifying portion 40 proceeds to the matching process at Step 220. If the confidence level test is not satisfied at Step 200 (NO), the verifying portion 40 performs the confidence level test for subsequent set of frames as long as the validation period does not elapse (Step 210: NO). That is, the verifying portion 40 repeats Step 200 within the validation period until the confidence level test satisfies. It should be noted if the validation period elapses at Step 210 (YES), the auto-braking system 10 terminates the process.

At Step 220, the verifying portion 40 compares the color of the traffic light 32 in the image for each frame with the color of the traffic light 32 obtained from the SPaT message that has been received.

If the colors in n consecutive frames over the validation period match with the colors obtained from the SPaT message at Step 220 (YES), the verifying portion 40 verifies the content in the SPaT message is valid. On the contrary, the colors in n consecutive frames do not match with the colors obtained from the SPaT message (Step 220: NO), the verifying portion 40 does not verify the content in the SPaT and the process terminates.

When Step 220 is true (YES), the executing portion 42 executes the AEB by controlling the braking device 14 to stop the vehicle 12. In the AEB, the executing portion 42 calculates first the full stop deceleration rate $a_{aeb}$ at Step 230. Then, the executing portion 42 controls the braking device 14 to slow the vehicle 12 at the full stop deceleration rate $a_{aeb}$ at Step 240. As a result, the vehicle 12 is more strongly slowed by the braking device 14 as compared to the ACB, and eventually stops at the stop position 44 at Step 250.

It should be understood that when Step 210 is true or when Step 220 is false, the auto-making system 10 may perform actions programmed in advance. For example, when the color of the traffic light 32 detected by the camera 18 is red, whereas the color of the traffic light 32 obtained from the SPaT message is green, the auto-making system 10 may rely on only the color detected by the camera 18 (i.e., the auto-making system 10 slows the vehicle to stop before the traffic light 32).

As described above, the auto-braking system 10 according to the present embodiment is configured to perform the ACB when the determining portion 38 determines that the vehicle 12 will violate a red signal if the vehicle 12 continues to travel under the current travelling conditions. The ACB is triggered based on the SPaT/MAP messages which the auto-braking system 10 can detect from a traffic light 32 through V2I communication earlier than the auto-braking system 10 detects the traffic light 32 by the camera 18. Therefore, it would be possible to avoid a situation where the vehicle 12 is too close to a traffic light 32 to stop when the vehicle 12 detects a red signal of the traffic light 32. In other words, the auto-braking system 10 early starts braking so that the vehicle 12 can safely, comfortably, and surely stop at the stop position 44.

Furthermore, the comfortable deceleration rate $a_{aeb}$ for the ACB is set to have an absolute value less than that of the full stop deceleration rate $a_{aeb}$ for the AEB. Thus, the vehicle 12 is gently slowed during the ACB without giving anxiety or fear to the driver when the ACB starts. In contrast, the AEB is strongly performed with the full stop deceleration rate $a_{aeb}$ which has an absolute value greater than that of the comfortable deceleration rate $a_{acb}$, the vehicle 12 can be stably slowed. As a result, the vehicle 12 can be certainly stopped at the stop position 44 before the traffic light 32.

The verifying portion 40 verifies reliability of the contents of the SPaT messages during the validation period. Therefore, the necessity of the AEB can be confirmed before actually executing the AEB. In addition, the verifying portion 40 verifies the contents of the SPaT messages when the color of the traffic light 32 obtained from the image data for each frame matches with the color of the traffic light 32 contained in the SPaT message for the validation period. The accuracy of the verification process by the verifying portion 40 is ensured as compared with a situation where only one frame of the captured image is compared with the SPaT message.

(Other Embodiments)

In the above-described embodiments, the Flea3 camera 18 is used as a sensor to optically capture an image of a traffic light 32. However, any other types of camera 18s may be used as the sensor.

Although the auto-braking system 10 in the above-described embodiment executes the CEB when an emergency situation occurs, the CEB may be executed in a normal situation. For example, when the vehicle 12 is a fully-automated vehicle, the auto-braking system 10 may execute the CEB in any situations as long as at least Steps 130, 140 and 170 shown in FIG. 6 are met.

In the above-described embodiment, the auto-braking system 10 starts performing the AEB immediately after verifying the content of the SPaT message. However, the AEB may be performed when a specified time period elapses after verifying the content of the SPaT message.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed. As used herein, the term "and/or" includes any and all combinations of one or more of the associated listed items.

What is claimed is:

1. An auto-braking system for a vehicle, comprising:
    a braking device that slows the vehicle;
    a receiver that receives messages each containing traffic light state information from a traffic light ahead of the vehicle over Vehicle-to-Infrastructure communication;
    a sensor that optically captures an image of the traffic light after the receiver received the messages; and
    a controller that controls operation of the braking device, wherein
    the controller includes:
        a determining portion that determines whether the vehicle will violate a red signal of the traffic light, if the vehicle continues to travel under current traveling conditions, based on the traffic light state information when the receiver receives the messages;
        a verifying portion that verifies the traffic light state information is valid by comparing the traffic light state information with the image of the traffic light captured by the sensor when the sensor captures the image of the traffic light; and
        an executing portion that executes:
            (i) a first braking control to slow the vehicle at a first deceleration rate by controlling the braking device when the determining portion determines that the vehicle will violate a red signal; and
            (ii), after the first braking control was executed, a second braking control to slow the vehicle at a second deceleration rate to stop at a specified position by controlling the braking device when the verifying portion verifies that the traffic light state information is valid.

2. The auto-braking system according to claim 1, wherein the second deceleration rate has an absolute value that is greater than that of the first deceleration rate.

3. The auto-braking system according to claim 1, wherein the verifying portion compares, for a validation period, color of the traffic light in each frame of the image with the traffic light state information contained in one of the messages currently received by the receiver, and
the verifying portion verifies the traffic light state information when the color matches with the traffic light state information during the validation period.

4. The auto-braking system according to claim 1, wherein the determining portion determines whether the vehicle will violate a red signal of the traffic light when the vehicle reaches a position a specified distance away from the traffic light.

5. The auto-braking system according to claim 1, wherein the sensor is a camera.

6. The auto-braking system according to claim 1, wherein the sensor captures the image of the traffic light after the executing portion executes the first braking control.

7. An auto-braking controller for a vehicle, comprising:
a determining portion that determines whether the vehicle will violate a red signal of a traffic light ahead of the vehicle, if the vehicle continues to travel under current traveling conditions, based on traffic light state information contained in each of messages received by a receiver from the traffic light over Vehicle-to-Infrastructure communication when the receiver receives the messages;
a verifying portion that verifies the traffic light state information is valid by comparing the traffic light state information with an image of the traffic light optically captured by a sensor when the sensor receives the image of the traffic light after the receiver received the messages; and
an executing portion that executes:
(i) a first braking control to slow the vehicle at a first deceleration rate by controlling a braking device when the determining portion determines that the vehicle will violate a red signal; and
(ii), after the first braking control was executed, a second braking control to slow the vehicle at a second deceleration rate to stop at a specified position by controlling the braking device when the verifying portion verifies that the traffic light state information is valid.

8. The auto-braking controller according to claim 7, wherein
the second deceleration rate has an absolute value that is greater than that of the first deceleration rate.

9. The auto-braking controller according to claim 8, wherein
the verifying portion compares, for a validation period, color of the traffic light in each frame of the image with the traffic light state information contained in one of the messages currently received by the receiver, and
the verifying portion verifies the traffic light state information when the color matches with the traffic light state information during the validation period.

10. The auto-braking controller according to claim 8, wherein
the determining portion determines whether the vehicle will violate a red signal of the traffic light when the vehicle reaches a position a specified distance away from the traffic light.

11. The auto-braking controller according to claim 8, wherein
the image of the traffic light is captured by the sensor after the executing portion executes the first braking control.

12. A method for auto-braking a vehicle, comprising:
receiving, with a receiver, messages each containing traffic light state information from a traffic light ahead of the vehicle over Vehicle-to-Infrastructure communication;
determining, with a determining portion, whether the vehicle will violate a red signal of the traffic light, if the vehicle continues to travel under current traveling conditions, based on the traffic light state information when the receiver receives the messages;
executing, with an executing portion, a first braking control to slow the vehicle at a first deceleration rate by controlling a braking device when the determining portion determines that the vehicle will violate a red signal;
optically detecting, with a sensor, an image of the traffic light after the receiver received the messages;
verifying, with a verifying portion, the traffic light state information is valid by comparing the traffic light state information with the image of the traffic light captured by the sensor when the sensor captures the image of the traffic light; and
after the first braking control was executed, executing, with the executing portion, a second braking control to slow the vehicle at a second deceleration rate to stop at a specified position by controlling the braking device when the verifying portion verifies that the traffic light state information is valid.

13. The method according to claim 12, wherein
the second deceleration rate has an absolute value that is greater than that of the first deceleration rate.

14. The method according to claim 13, further comprising:
comparing, with the verifying portion, for a validation period, color of the traffic light in each frame of the image with the traffic light state information in one of the messages currently received by the receiver, wherein
the verifying portion verifies the traffic light state information when the color matches with the traffic light state information during the validation period.

15. The method according to claim 13, wherein
the determining portion determines whether the vehicle will violate a red signal of the traffic light when the vehicle reaches a position a specified distance away from the traffic light.

16. The method according to claim 13, wherein
the step of capturing the image of the traffic light is performed after executing the first braking control.

* * * * *